June 19, 1928.  
W. J. KRILL  
WINDOW WASHING APPARATUS  
Filed May 28, 1926
1,674,207
2 Sheets-Sheet 1
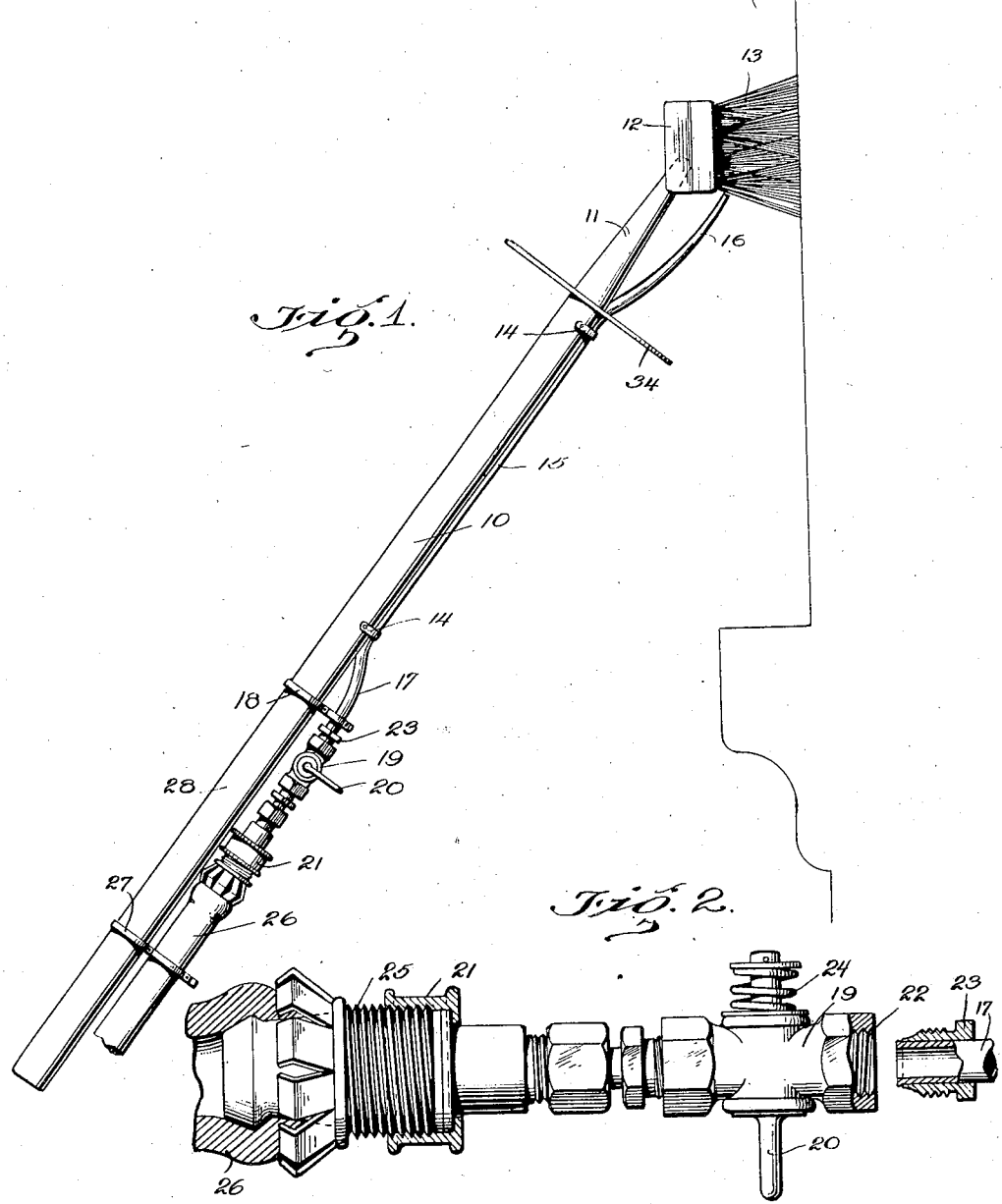

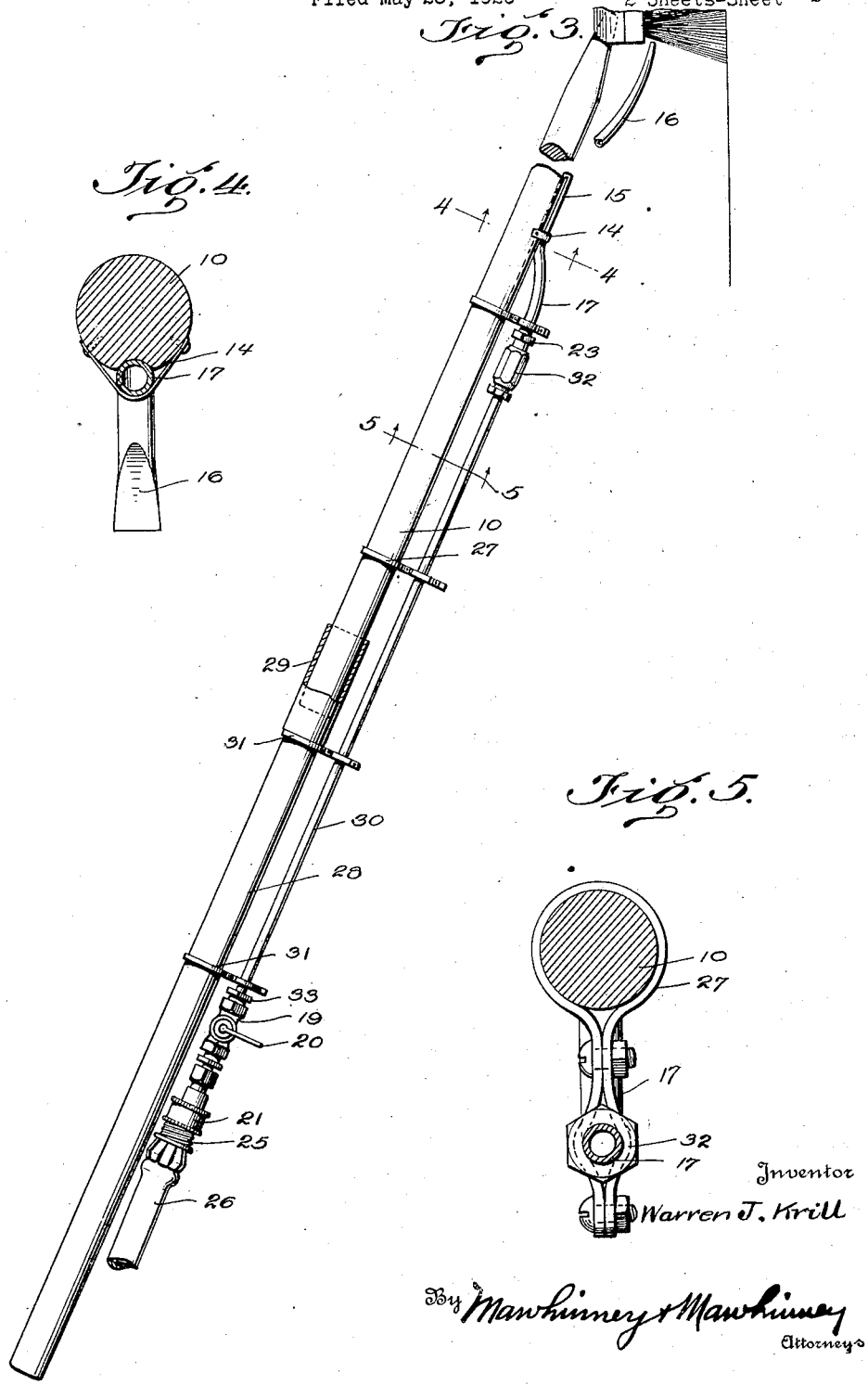

Patented June 19, 1928.

1,674,207

UNITED STATES PATENT OFFICE.

WARREN J. KRILL, OF EAST CHICAGO, INDIANA.

WINDOW-WASHING APPARATUS.

Application filed May 28, 1926. Serial No. 112,314.

The present invention relates to improvements in window washing apparatus, and more particularly to an improved extension brush adapted to be supported and operated by hand for reaching high windows and the like.

An object of the present invention is to provide a window cleaning apparatus or brush of this character which has a brush head and a number of staff or handle sections detachably connected together to provide a handle of desired length, and which at the same time is equipped with water or other fluid supply means for application to the brush and which may be carried from section to section of the handle.

Another object of the invention is to provide an improved water conduit or supply means on each section of the handle so arranged that the couplings of the water supply means are offset from the couplings of the handle sections to accommodate a hose connection and valve near the lower end of each handle section and to strengthen the device as a whole.

Another object of the invention is to provide an improved support for a water pipe and its connections, so that the water pipe may carry a valve and a hose connection upon the lower section of the handle irrespective of the length of the handle and with the controlling valve spaced sufficiently from the lower end of the handle section to admit the free grasping and manipulation of the handle without interference from the valve.

The invention also aims to provide a novel bracket mounting for the water pipe to hold the same on its respective sections in proper position for quick coupling and separation of the handle sections and the water pipe sections.

With the foregoing and other objects in view, the invention will be more fully described hereinafter, and will be more particularly pointed out in the claim appended hereto.

In the drawings, wherein like symbols refer to like or corresponding parts throughout the several views, Figure 1, is a side elevation of a window washing apparatus constructed according to the present invention, and wherein but a single handle section is used.

Figure 2 is a detail enlarged elevation partly in section of the valve and hose connection detachably mounted upon the lower end of the water supply pipe of the handle section shown in Figure 1.

Figure 3 is a side elevation, partly broken away, of a handle comprising two sections showing the single section of Figure 1 provided with a second section, and showing the controlling valve and hose coupling transferred to the lower handle section.

Figure 4 is an enlarged transverse section taken through the upper portion of the apparatus substantially on the line 4—4 of Figure 3 and looking upwardly therefrom, showing the water delivery nozzle and the mounting of the water pipe on the upper handle section, and Figure 5 is a similar view taken substantially on the line 5—5 of Figure 3 and looking upwardly therefrom showing the detachable coupling between the sections of water supply pipe.

Referring to the drawings, 10 designates a handle section of any suitable length and which is preferably round so that it may be easily grasped and held in the hands. The upper end 11 of the handle section is preferably tapered, or otherwise suitably shaped to receive detachably thereon a brush head 12 having the usual bunches of bristles 13 for application to a window or other surface to be cleaned. The brush head 12 is preferably seated at an angle upon the upper end 11 of the handle section so that when the handle section 10 is elevated at an inclination, such as shown in Figures 1 and 3, the bunches of bristles 13 may extend horizontally from the upper end of the handle and engage flat against the window or other surface being cleaned. Secured along, preferably the under side of the handle 10 and by clips 14, is a water supply pipe section 15 of any suitable diameter to carry a desired quantity of water upwardly along the handle section 10. The upper clip 14 is located in spaced relation to the brush head 12, and the section 15 of water supply pipe is preferably bent or curved outwardly from the upper end 11 of the handle section and flattened at its upper end portion to provide a feeding nozzle 16 which terminates in closely spaced relation beneath the bunches of bristles 13 so as to feed a flat stream of water to the brush and to spread the water over a substantial area of the bristles.

The lower end of the water supply pipe section 15 is also bent outwardly, as at 17 at a point below the lower clip 14 and the outwardly bent portion 17 is secured in a brace 18 mounted on the handle 10, so as to hold the sections 17 rigidly in spaced relation to the handle. The brace 18 is of sufficient length to space the portion 17 of the pipe 15 from the handle 10 in order to accommodate a valve 19 having a handle 20, and a hose connection 21 disposed below the valve. From Figure 2, particularly, it will be noted that the valve 19 has a threaded end 22 adapted to receive the adjacent end of the pipe portion 17, and to also receive a coupling nut 23 which is carried on the pipe portion 17 and adapted to bind thereon when the coupling nut 23 is screwed into the end 22 of the valve 19. The valve 19 may be of any approved type, but is shown as of the turning plug type having a tension spring 24 to normally urge the tapered plug to its seat. The other or lower end of the valve 19 is provided with any suitable hose connection 21 adapted to thread upon a nipple 25 or other hose terminal which may be employed, and which is of the usual type so as to adapt the present apparatus for use with an ordinary garden hose. The hose is shown at 26 as secured to the coupling 21, and the handle 10 is provided with a section brace 27 having an outer end portion of sufficient size to receive the hose 26 and hold it against longitudinal or lateral displacement, thus relieving the connection 22 and the coupling 23 from the strain of supporting the hose directly from the handle. By the arrangement shown the brace 27 takes up the weight of the hose.

The device may be adjusted to greater length, as shown in Figure 3, by the use of a second handle section 28 similar in construction to the handle section 10, but which is provided on its upper end with an enlarged socket 29 adapted to receive the lower end of the handle section 10 for connecting the two handle sections 10 and 28 together. In this instance, the valve 19 and the hose connection 21 are disconnected from the pipe portion 17 by releasing the coupling nut 23 from the pipe portion 17. The extension section 28 of the handle carries an extension water feeding pipe 30 connected to the handle section 28 by brackets 31 suitably spaced apart and engaging the pipe section 30. The brackets 31 are of substantially the same size and length as the bracket 27 of the handle section 10, so as to hold the pipe section 30 in suitably spaced relation from the handle section 28 to register with the outwardly bent pipe section 17 on the upper handle section. A coupling piece 32 is mounted on the upper end of the pipe section 30 and is adapted to receive therein the coupling nut 23 for connecting the pipe sections 15 and 30 together. It will be noted that the coupling nut 23 is spaced above the lower end of the handle section 10 a considerable distance so that the valve 19 and the coupling 21 may be accommodated between the nut 23 and the lower end of the handle, and to also provide sufficient space for freedom of the fingers in grasping and operating the handle 10. The coupling nut 23 is therefore located considerably above the socket 29, or the lower end of the section 10, so that the joints between the pipe sections and the handle sections are offset one from the other and thus less strain is imposed upon the pipe sections.

The lower end of the pipe section 30 is provided with a coupling nut 33 of the same size as the coupling nut 23 so that the valve 19 may be easily removed from the upper handle section and applied to the lower handle section without appreciable change and to admit of the interchanging of the valve 19 and pipe coupling 21 with the socket connection 32 of the lower pipe section.

For the purpose of preventing water to run downwardly of the handle sections 10 and 28, the upper end of the handle section 10 is provided with a guard plate or disc 34 which may be of rubber or other suitable material and which is of sufficient size to catch water from the brush and from the upper end of the handle, to deflect the water from the handle and off of the shield or guard 34. The shield or guard 34 may be positioned at any suitable point along the handle, so that the water which flows back from the brush will be caught and returned either to its source, or elsewhere to prevent the wetting of the operator.

In use, it is apparent that the handle may comprise any number of sections, and the sections are used either singly or in numbers to obtain a handle which is of desired length. The valve 19 and the hose coupling 21 are carried as a unit and detachably connect to the lower end of the pipe section which is lowermost in the handle, the single section being used as shown in Figure 1, or two sections being employed as shown in Figure 3.

After the proper couplings have been made, water under pressure is admitted to the hose 26 and thence upwardly through the valve 19 when open, so that the water may be forced upwardly through the pipe sections 20 and 15 respectively, and be finally sprayed or directed outwardly from the nozzle 16 onto the bunches of bristles 13 of the brush.

It will be particularly noted that the brackets 27 and 31 are so arranged as to hold the pipe sections 15 and 30 in line, and whereby easy adjustment of the pipe sections may be had without bending or changing the locations of any of them.

It is obvious that various changes and modifications may be made in the details of construction and design of the above specifically described embodiment of this invention without departing from the spirit thereof, such changes and modifications being restricted only by the scope of the following claim:—

What is claimed is:—

A window washing apparatus, comprising a plurality of handle sections, means for detachably connecting said handle sections in desired number and in end to end relation to extend the handle to the desired length, a brush mounted on the outer end of the outermost handle section, a water supply pipe section secured along each handle section, the outer end of the water supply pipe section of the outermost handle section being disposed adjacent to the stock of said brush for supplying water thereto, the inner end of each water supply pipe section being spaced outwardly from the adjacent portion of its handle section, a bracket on each handle section engaging the adjacent portion of the water supply pipe to support the same, a like coupling member on the inner end of each water supply pipe section, a combined controlling valve and hose coupling, and a like complemental coupling member on the outer end of each of the water supply pipe sections of the inner handle sections and the outer end of the combined controlling valve and hose coupling, whereby the desired number of inner handle sections may be used and the combined controlling valve and hose coupling may be attached to the water pipe section of the innermost handle section.

In testimony whereof I affix my signature.

WARREN J. KRILL.